Nov. 13, 1923.
C. C. FARMER
FEED VALVE DEVICE
Filed Oct. 16, 1922
1,473,758
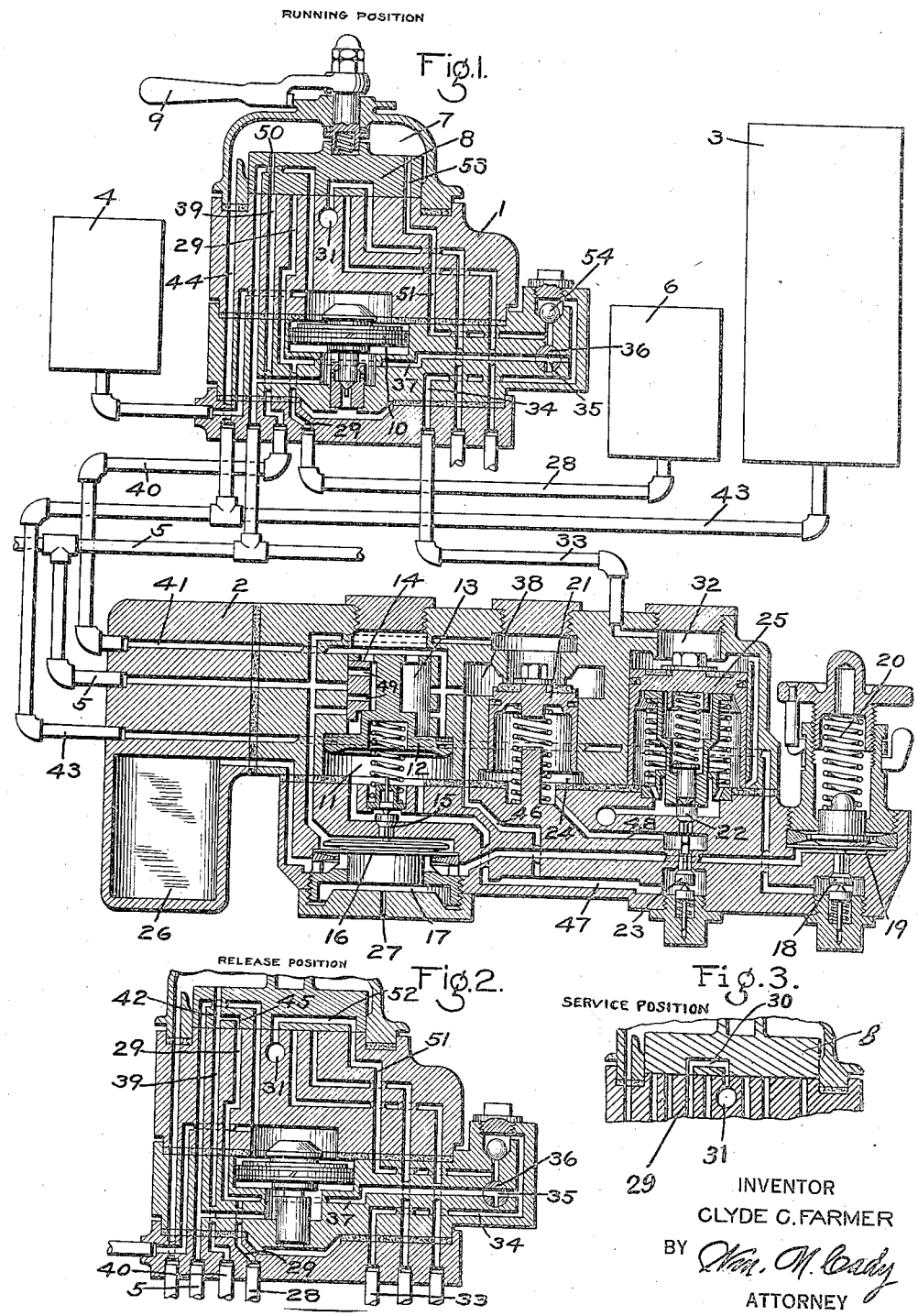
INVENTOR
CLYDE C. FARMER
BY Wm. M. Cady
ATTORNEY Patented Nov. 13, 1923.

1,473,758

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FEED-VALVE DEVICE.

Application filed October 16, 1922. Serial No. 594,785.

*To all whom it may concern:*

Be it known that I, CLYDE C. FARMER, a citizen of the United States, residing at Pittsburgh, in the county of Allegheny and State of Pennsylvania, have invented new and useful Improvements in Feed-Valve Devices, of which the following is a specification.

This case relates to fluid pressure brakes, and more particularly to a feed valve device for maintaining the pressure in the brake pipe.

The principal object of my invention is to provide an improved feed valve device having means for preventing the overcharging of the brake pipe.

In the accompanying drawing; Fig. 1 is a diagrammatic view, partly in section, of a portion of a locomotive brake equipment, including a feed valve device and embodying my invention; Fig. 2 a sectional view of the engineer's brake valve device in release position, and Fig. 3 a sectional view of a portion of the engineer's brake valve showing the rotary valve in service application position.

The apparatus shown in Fig. 1 includes a brake valve device 1, a feed valve device 2, a main reservoir 3, an equalizing reservoir 4, a brake pipe 5, and a timing reservoir 6.

The brake valve device 1 may be of the usual construction comprising a casing having a valve chamber 7 containing a rotary slide valve 8 adapted to be operated by a handle 9 and included in the casing is the usual equalizing discharge valve mechanism 10, subject on one side to brake pipe pressure and on the opposite side to the pressure in the equalizing reservoir 4.

The feed valve device 2 may comprise a casing having a piston chamber 11 containing piston 12 and a valve chamber 13 containing a slide feed valve 14 adapted to be operated by piston 12. The operation of piston 12 is controlled by a valve 15 adapted to be operated by a diaphragm 16 for venting fluid from the piston chamber 11. The pressure in chamber 17 at one side of the diaphragm 16 is maintained constant at the standard pressure carried in the brake pipe, by the operation of a regulating portion comprising a valve 18 and a diaphragm 19 for operating said valve, the diaphragm 19 being subject to the pressure of an adjustable regulating spring 20 on one side and subject on the opposite side to the pressure in chamber 17.

For supplying fluid to the brake pipe at high pressure and at a rapid rate when the brake valve is turned to release position, a supply valve 21 is provided which may be a valve piston as shown. The operation of the supply valve 21 is controlled by a timing valve mechanism comprising double beat valves 22 and 23 for controlling the fluid pressure in piston chamber 24 at one side of the valve piston 21 and a valve piston 25 for operating said valves.

A volume increasing chamber 26 may be connected to the diaphragm chamber 17 in order to minimize the possible variations in pressure in chamber 17 and a restricted atmospheric vent port 27 is connected to the chamber 17 so as to require a positive opening of the valve 18 which also tends to prevent fluctuations in pressure in the chamber 17.

In service applications and all other positions of the brake valve except running and release positions, the timing reservoir 6 is connected through pipe 28, passage 29, and a cavity 30 in the rotary valve 8 with an exhaust port 31, as shown in Fig. 3 and the chamber 32 above the valve piston 25 is also connected to said exhaust port through pipe 33, passage 34, through a port 35 in a cut-out cock 36, and passage 37 which connects with passage 29.

It will thus be seen that when the brake valve is turned to service position for effecting a reduction in brake pipe pressure so as to cause a service application of the brakes, the timing reservoir 6 and chamber 32 of the timing valve piston 25 are connected to the atmosphere.

In service application position, however, the main reservoir supply is cut off from valve chamber 13 and from valve chamber 38, since passage 39, which communicates through pipe 40 and passage 41 with said valve chambers, is blanked by the rotary valve 8. In service application position, the valve piston 25 will be shifted to its upper seat by the venting of fluid from valve chamber 32, so as to close the valve 23 and open valve 22 and fluid will then be vented from chamber 24, so that the valve piston 21 will be shifted by brake pipe pressure to its open position, but since the main reservoir supply is now cut off from valve chamber 38, fluid under pressure will not be supplied to the brake pipe by the opening of the valve piston 21.

When the brake valve handle is turned to release position after an application of the brakes, the exhaust connection to the timing reservoir 6 and the timing valve 25 is cut off and the passage 29 is connected through a large port 42 through the rotary valve 8 with rotary valve chamber 7 which is supplied with fluid from the main reservoir 3 through pipe 43 and passage 44.

The valve piston 25 being initially in its upper position when the brake valve handle is turned to release position, the valve piston 21 will be in its open position, and since fluid under pressure from the main reservoir is now supplied to valve chamber 38 by way of port 42, passage 39, pipe 40, and passage 41, fluid will be supplied at a rapid rate to the brake pipe 5, so as to provide the desired quick inshot of fluid to the brake pipe.

The flow of fluid from the main reservoir to the brake pipe continues until the pressure in the timing reservoir 6 and in valve chamber 32 has been increased to a predetermined degree by flow through a restricted branch port 45 which is of such size that the timing reservoir will be charged to the predetermined degree in the period of time determined upon as necessary to secure the desired quick recharge of the brake pipe.

When this predetermined pressure has been attained, the valve piston 25 will be operated thereby so as to close the valve 22 and open the valve 23. Fluid under pressure is then supplied to chamber 24 through passages 46 and 47, past the valve 23 to passage 48. The valve piston 21 is then shifted to its upper seat, cutting off the further supply of fluid to the brake pipe at full main reservoir pressure.

When the excess pressure in the brake pipe at the head end of the train subsides and should the pressure in the brake pipe fall below the standard pressure by flow from head to rear of the train, the valve 15 will be opened by the standard pressure acting below the diaphragm 16 and fluid will be vented from piston chamber 11 to the brake pipe 5. The piston 12 then shifts the slide valve 14 to its open position and fluid is supplied to the brake pipe through ports 49. Two ports or a large capacity port is provided so that flow to the brake pipe will be at a high rate, but since the operation of the piston 12 is controlled by the diaphragm 16 and valve 15 the pressure of fluid supplied to the brake pipe will be limited to the standard pressure for which the regulating spring 20 is adjusted to maintain in the chamber 17.

In the running position of the brake valve, as shown in Fig. 1, the supply passage 39 is connected to the rotary valve chamber 7 through a restricted port 50 for the reason that should the brake valve be left in release position, the slide valve 14 having larger supply ports than usual, if an emergency application of the brakes be initiated at a point in the train other than the head end, the more rapid flow to the brake pipe through the feed valve device might prevent the brake pipe pressure from being reduced sufficiently to ensure an emergency application of the brakes.

By turning the brake valve handle to running position, since the flow of fluid to valve chamber 13 of the feed valve device is now limited, the flow to the brake pipe will be correspondingly restricted, even though the feed valve move to its wide open position.

The cut-out cock 36 is provided for the purpose of cutting the limited brake pipe charging feature out of operation. When said cock is turned from the position shown in the drawing to a position in which the port 35 connects passage 34 with passage 51, upon turning the brake valve handle to release position the chamber 32 above the piston 25 will be connected to the exhaust by way of pipe 33, passage 34, port 35, passage 51, cavity 52 in the rotary valve 8 and exhaust port 31.

As previously described, the chamber 32 is connected to the exhaust in service application position of the brake valve and thereby the valve 22 is operated to vent fluid from chamber 24 so that the supply valve 21 is held in open position. Consequently with the cock 36 in the cut-out position, the supply valve 21 will remain in its open position for supplying fluid to the brake pipe, so long as the brake valve handle is kept in release position.

A port 53 in the rotary valve registers with passage 51 in the running position so that fluid from the main reservoir is supplied to the chamber 32 of the timing valve 25 to maintain same in its lower position, in which the valve 23 is opened to supply fluid to the chamber 24 and thus cause the supply valve 21 to be held closed so long as the brake valve remains in running position.

A check valve 54 is interposed in the passage 51 to prevent back flow from the timing reservoir and the timing valve in release position of the brake valve and when the cock 36 is in its open position, as otherwise the timing reservoir would be prevented from charging as intended by being connected to the exhaust port 31.

Having now described my invention, what

I claim as new and desire to secure by Letters Patent, is:—

1. In a fluid pressure brake, the combination with a brake pipe, a source of fluid under pressure, and a valve for supplying fluid from said source of pressure to the brake pipe, of a brake valve device having one position for supplying fluid from said source through a large port to said supply valve and another position for supplying fluid from said source through a restricted port to said supply valve.

2. In a fluid pressure brake, the combination with a brake pipe, a source of fluid under pressure, and a valve for supplying fluid from said source of pressure to the brake pipe, of a brake valve device having a release position in which fluid is supplied from said source through a large port to said supply valve and a running position in which fluid is supplied to said valve through a restricted port.

3. In a fluid pressure brake, the combination with a brake pipe, a source of fluid under pressure, and a feed valve for supplying fluid from said source through a large port area to the brake pipe, of a brake valve device having one position in which fluid is supplied from said source to said feed valve through a large port and another position in which fluid is supplied from said source through a restricted port to said feed valve.

4. In a fluid pressure brake, the combination with a brake pipe and a valve for supplying fluid to the brake pipe, of means operated by venting fluid pressure therefrom for opening a port for venting fluid from said supply valve to operate same and a brake valve device having a running position in which fluid under pressure is supplied to said means for closing said vent port.

5. In a fluid pressure brake, the combination with a brake pipe and a valve for supplying fluid to the brake pipe, of a valve for venting fluid from said supply valve for opening said supply valve, a valve for supplying fluid to said supply valve for closing same, a piston for operating said valves, and a brake valve device having a position for supplying fluid to said piston.

6. In a fluid pressure brake, the combination with a brake pipe and a valve for supplying fluid to the brake pipe, of a valve for venting fluid from said supply valve for opening said supply valve, a valve for supplying fluid to said supply valve for closing same, a piston for operating said valves, and a brake valve device having a running position and a release position in which fluid is supplied to said piston and a service application position in which fluid is vented from said piston.

7. In a fluid pressure brake, the combination with a brake pipe, of a supply valve device for first supplying fluid to the brake pipe in releasing the brakes at high pressure for a predetermined period of time and a feed valve device for then supplying fluid to the brake pipe through a large port area but at a pressure limited to the standard pressure carried in the brake pipe.

8. In a fluid pressure brake, the combination with a brake pipe and a main reservoir, of a supply valve device for supplying fluid at main reservoir pressure to the brake pipe for a limited period of time in releasing the brakes and a feed valve device for then supplying fluid to the brake pipe through large ports at a predetermined pressure less than the main reservoir pressure.

In testimony whereof I have hereunto set my hand.

CLYDE C. FARMER.